(12) United States Patent
Junghänel et al.

(10) Patent No.: US 12,166,433 B2
(45) Date of Patent: Dec. 10, 2024

(54) POWER CONVERTER AND METHOD FOR OPERATING A POWER CONVERTER (71) Applicant: Siemens Aktiengesellschaft, Munich (DE)

(72) Inventors: René Junghänel, Marloffstein (DE); Klaus Nieberlein, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 18/018,413

(22) PCT Filed: Jul. 28, 2021

(86) PCT No.: PCT/EP2021/071104
§ 371 (c)(1),
(2) Date: Jan. 27, 2023

(87) PCT Pub. No.: WO2022/023398
PCT Pub. Date: Feb. 3, 2022

(65) Prior Publication Data
US 2023/0299693 A1    Sep. 21, 2023

(30) Foreign Application Priority Data
Jul. 30, 2020 (EP) .................................... 20188704

(51) Int. Cl.
*H02M 7/08* (2006.01)
*H02M 5/458* (2006.01)
(Continued)

(52) U.S. Cl.
CPC ......... *H02M 7/797* (2013.01); *H02M 5/4585* (2013.01); *H02P 27/06* (2013.01)

(58) Field of Classification Search
CPC ............... H02M 7/797; H02M 5/4585; H02M 1/0016; H02M 1/0048; H02M 1/0058;
(Continued)

(56) References Cited

U.S. PATENT DOCUMENTS

| 2014/0321019 A1* | 10/2014 | Volke | ...................... | H02M 1/32 |
| | | | | 361/91.1 |
| 2017/0279361 A1* | 9/2017 | Raju | ...................... | H02M 1/12 |

(Continued)

FOREIGN PATENT DOCUMENTS

DE    3732592 A1    4/1989

OTHER PUBLICATIONS

PCT International Search Report mailed Sep. 20, 2022 corresponding to PCT International Application No. PCT/EP2021/071104 filed Aug. 28, 2021.

*Primary Examiner* — Muhammad S Islam
(74) *Attorney, Agent, or Firm* — Henry M. Feiereisen LLC (57) ABSTRACT A method for operating a power converter as an inverter between a DC voltage and an AC voltage grid is disclosed. For each AC voltage phase of the AC voltage grid, the power converter has at least one half-bridge which is connected to the AC voltage phase and has two semiconductor switches. Each semiconductor switch is reversed-connected in parallel with a diode. An activation angle range is determined for each semiconductor switch within an angle period, the lower range limit of which activation angle range is formed by subtracting a pre-firing angle from the lower range limit of a switch angle range, and the upper range limit of which activation angle range is formed by subtracting a pre-extinction angle from the upper range limit of the switch angle range.

14 Claims, 8 Drawing Sheets

(51) Int. Cl.
*H02M 7/797* (2006.01)
*H02P 27/06* (2006.01)

(58) Field of Classification Search
CPC ........ H02M 1/44; H02M 7/539; H02M 7/538; H02P 27/06
See application file for complete search history.

(56) References Cited

U.S. PATENT DOCUMENTS

2020/0274359 A1* 8/2020 Ernst ................... H02M 7/49
2021/0159811 A1* 5/2021 Lange .................. H02M 7/797
2021/0359615 A1 11/2021 Halfmann ........... H02M 1/0095
2021/0384860 A1* 12/2021 Weis ................ H02M 7/53876

* cited by examiner

POWER CONVERTER AND METHOD FOR OPERATING A POWER CONVERTER

CROSS-REFERENCES TO RELATED APPLICATIONS

This application is the U.S. National Stage of International Application No. PCT/EP2021/071104, filed Jul. 28, 2021, which designated the United States and has been published as International Publication No. WO 2022/023398 A1 and which claims the priority of European Patent Application, Ser. No. 20/188,704.9, filed Jul. 30, 2020, pursuant to 35 U.S.C. 119(a)-(d).

BACKGROUND OF THE INVENTION

The invention relates to a power converter and a method for operating a power converter as an inverter between a DC voltage with a high potential and a low potential, and an AC voltage network. For each AC voltage phase of the AC voltage network, the power converter has at least one half-bridge which is connected to the AC voltage phase and has a high potential-side semiconductor switch and a low potential-side semiconductor switch, wherein each semiconductor switch Is connected antiparallel to a diode.

In particular, the Invention relates to a network-side power converter of this type of a frequency converter which in normal operation supplies an electric motor with energy from the AC voltage network. With this operational mode, the network-side power converter is operated as a rectifier which rectifies an alternating voltage from the AC voltage network by way of the diodes, wherein the semiconductor switches are not triggered. A load-side power converter of the frequency converter then generates the AC voltage for the electric motor.

A frequency converter of this type can, however, also be operated in an energy-recovery operation for feeding back electrical energy that is generated by the electric motor in a generator operation into the AC voltage network. In this operational mode, the load-side power converter of the frequency converter is operated as a rectifier to rectify an AC voltage generated by the electric motor and the network-side power converter of the frequency converter is operated at the network frequency of the AC voltage network as an inverter to generate the AC current fed back into the AC voltage network. The semiconductor switches of the network-side power converter are therein triggered in dependence upon the phase position of the AC voltage phases of the AC voltage network. For example, in the case of a three-phase AC voltage network, a high potential-side semiconductor switch is switched in during time intervals in which the AC voltage phase connected to the semiconductor switch has a higher potential, in each case, and/or lies at a higher electric potential than the two other AC voltage phases.

However, in this type of operation of the network-side power converter in partial-load operation of the frequency converter with low regenerative load, a high level of reactive power arises in the power converter. This reactive power level is undesirable, mainly due to the additional ohmic losses resulting therefrom and also ultimately reduces the partial-load efficiency of the frequency converter. The cause thereof is finally the freewheeling path of the network power via the antiparallel diodes of the network-side power converter which can arise from an unhindered oscillation. Furthermore, by way of the hard switching off of a semiconductor switch, within a short time, the current is then commutated to the associated freewheeling diode and then to the semiconductor switch of another AC voltage phase. This leads to high current rise rates in the network current, by way of which network filters and resonances can be excited in the AC voltage network. As a result of this, the diodes also cannot be designed as conduction-optimized network diodes, but must be designed as switching diodes suitable for rapid switching processes. They also have the disadvantage of greater conduction losses and lower short-circuit current capability as compared with network diodes.

It is an object of the invention, during operation of a power converter of the aforementioned type as an inverter, to reduce the reactive power level generated in the power converter and the current rise rates produced in the power converter.

SUMMARY OF THE INVENTION

The object is achieved, according to the invention, with a method as set forth hereinafter, a power converter as set forth hereinafter, a computer program as set forth hereinafter, and a use of the power converter as set forth hereinafter.

Advantageous embodiments of the invention are the subject matter of the subclaims.

With the method according to the invention, a power converter is operated as an Inverter between a DC voltage with a high potential and a low potential and an AC voltage network, wherein for each AC voltage phase of the AC voltage network, the power converter has at least one half-bridge which is connected to the AC voltage phase with a high potential-side semiconductor switch and a low potential-side semiconductor switch and each semiconductor switch is connected antiparallel to a diode. In this method for each semiconductor switch, within an angular period of a phase angle of the AC voltage, at least one switch angular range is given by a lower range limit and an upper range limit, for each switch angular range, a pre-ignition angle and a pre-quenching angle are determined, for each switch angular range, an activation angular interval is determined, the lower interval limit of which is formed by subtraction of the pre-ignition angle from the lower range limit of the switch angular range and the upper interval limit of which is formed by subtraction of the pre-quenching angle from the upper range limit of the switch angular range, and each semiconductor switch is switched on during each activation angular Interval determined for it.

Therefore, according to the invention, during operation of the power converter as an inverter, the activation angular intervals within which the individual semiconductor switches of the power converter are switched on are not rigidly specified, but rather for each activation angular interval, a switch angular range is specified which roughly sets the position of the activation angular interval, wherein however the interval limits of the activation angular interval are displaced by a pre-ignition angle and a pre-quenching angle relative to the range limits of the switch angular range. By this means, the interval limits of the activation angular intervals can advantageously be stipulated such that in the operation of the power converter as an inverter, a reactive power level and current rise rates can be reduced. Furthermore, the interval limits of the activation angular intervals of the power to be transferred from the power converter into the AC voltage network can be adapted. For example, the activation angular intervals can be increased as the power level to be transferred rises.

In one embodiment of the invention, the pre-ignition angle and the pre-quenching angle of a switch angular range of a semiconductor switch are each determined as the sum of a feed forward value and a correction value. The feed forward values are determined dependent upon an electrical power level to be transferred by the power converter into the AC voltage network and, by way of the correction values, a current which flows in the bridge arm of that half-bridge in which the semiconductor switch is arranged is readjusted.

The aforementioned embodiment of the invention enables, firstly, the interval limits of the activation angular intervals of the semiconductor switches to be adapted, by way of the feed forward values of the pre-Ignition angle and the pre-quenching angle, to the electrical power to be transferred from the power converter into the AC voltage network. Secondly, this embodiment of the invention further enables the interval limits to be set dynamically dependent upon the currents flowing in the respective bridge arms of the half-bridges in order to minimize a reactive power level and rise rates of these currents during operation of the power converter as an inverter.

In a further embodiment of the invention, the pre-ignition angle and the pre-quenching angle of a switch angular range of a semiconductor switch are determined such that the activation angular interval corresponds to a diode lead angle interval at which the diode connected antiparallel to the semiconductor switch has current flowing through it in an operation of the power converter as a rectifier with load conditions comparable to the operation of the power converter as an inverter. The interval limits of the activation angular interval therein preferably arise substantially from a mirroring of the interval limits of the corresponding diode lead angle interval at the midpoint of the switch angular range.

Thus the aforementioned embodiment of the invention adapts an activation angular interval of a semiconductor switch to a diode lead angle interval at which the diode connected antiparallel to the semiconductor switch under comparable load conditions has current flowing through it in an operation of the power converter as a rectifier. Thereby, a flow of the current through the semiconductor switch is advantageously realized which corresponds to the natural current flow through the diode in the rectifier operation of the power converter. Thereby, the current rise rates in the inverter operation of the power converter are adapted to the current rise rates in the rectifier operation and are substantially reduced to these current rise rates.

In a further embodiment of the invention, the midpoint of an activation angular interval is displaced relative to the midpoint of the associated switch angular range for the lower range limit of the switch angular range.

The previous embodiment of the invention also adapts the inverter of the power converter to the rectifier operation in order to reduce the current rise rates in inverter operation. The displacement of the midpoint of the activation angular interval relative to the midpoint of the associated switch angular range to the lower range limit of the switch angular range therein corresponds to an opposite displacement of the midpoint of the diode lead angle Interval in which current flows through the diode connected antiparallel to the semiconductor switch in the rectifier operation of the power converter.

In the event that the AC voltage network is multiphase, a further embodiment of the invention provides that for each semiconductor switch, within an angular period of a phase angle of the AC voltage, at least two switch angular ranges are specified by way of a lower range limit and an upper range limit in each case. By this means, in particular, the switch-on durations of the semiconductor switches are reduced and interrupted during a period of the AC voltage in order to reduce current oscillations through the diodes connected antiparallel to the semiconductor switches. Such current oscillations can form in relatively long uninterrupted switch-on durations of the individual semiconductor switches, in particular with low power levels to be transmitted by the power converter into the AC voltage network and cause a high reactive power level. It is therefore advantageous to reduce these current oscillations.

In the event that the AC voltage network is multiphase, a further embodiment of the Invention provides that the switch angular ranges are specified dependent upon interlinked voltages of the AC voltage phases. For example, each switch angular range of a high potential-side semiconductor switch is specified as a phase angle range in which the interlinked voltage between the AC voltage phase connected to the semiconductor switch and a further AC voltage phase is a greatest of all the Interlinked voltages. Correspondingly, for example, each switch angular range of a low potential-side semiconductor switch is specified as a phase angle range in which the interlinked voltage between the AC voltage phase connected to the semiconductor switch and a further AC voltage phase is a smallest of the interlinked voltages. The Interlinked voltage between the AC voltage phase connected to the semiconductor switch and a further AC voltage phase is understood to be the voltage that results from the subtraction of the voltage of the further AC voltage phase from the voltage of the AC voltage phase connected to the semiconductor switch.

The aforementioned embodiment of the invention advantageously adapts the switch-on times and durations of the semiconductor switches to the variation and/or the phase position of the interlinked voltages of the AC voltage network and thus enables, in particular, an optimized feed-in of energy into the AC voltage network by way of the power converter.

In the event that the AC voltage network is single-phase, a further embodiment of the invention provides that for each high potential-side semiconductor switch within an angular period of a phase angle of the AC voltage connected to the semiconductor switch, a switch angular range is specified, so that the AC voltage has a maximum in the switch angular range. Accordingly, a further embodiment of the invention provides, in the event that the AC voltage network is single-phase, that for each low potential-side semiconductor switch, within an angular period of a phase angle of the AC voltage connected to the semiconductor switch, a switch angular range is specified, so that the AC voltage has a minimum in the switch angular range.

The aforementioned embodiments of the invention for a single-phase AC voltage network correspond to the aforementioned embodiments of the invention for a multiphase AC voltage network, wherein the AC voltage of the single-phase AC voltage network connected to one semiconductor switch assumes the role of an interlinked voltage of the multiphase AC voltage network.

A power converter according to the invention between a DC voltage with a high potential and a low potential and an AC voltage network comprises     for each AC voltage phase of the AC voltage network, at least one half-bridge which is connected to the AC voltage phase with a high potential-side semiconductor switch and a low potential-side semiconductor switch,     for each semiconductor switch, a diode connected antiparallel to the semiconductor switch, and a control unit which is designed, during operation of the power converter as an inverter in accordance with the method according to the invention, to specify, for each semiconductor switch within an angular period of a phase angle of the AC voltage, the at least one switch angular range, to determine, for each switch angular range, the activation angular interval and to switch on each semiconductor switch during each activation angular interval determined for it.

Since a power converter according to the invention is configured to carry out the method according to the invention, the advantages of such a power converter correspond to the advantages mentioned above of the method according to the invention.

A computer program according to the Invention comprises commands which, on execution of the computer program by a control unit, cause it to carry out the method according to the invention.

The invention further provides for a use of a power converter according to the invention as part of a frequency converter which is configured for energy supply to an electric motor from the AC voltage network, wherein the power converter is operated for feeding back energy of the electric motor into the AC voltage network in accordance with the inventive method.

BRIEF DESCRIPTION OF THE DRAWING

The above-described properties, features and advantages of this invention and the manner in which these are achieved will now be described more clearly and Intelligibly in relation to exemplary embodiments, and illustrated in detail by reference to the drawings, in which.

DETAILED DESCRIPTION OF PREFERRED EMBODIMENTS

Parts which correspond to one another are provided with the same reference characters in the drawings.

Figure 1:
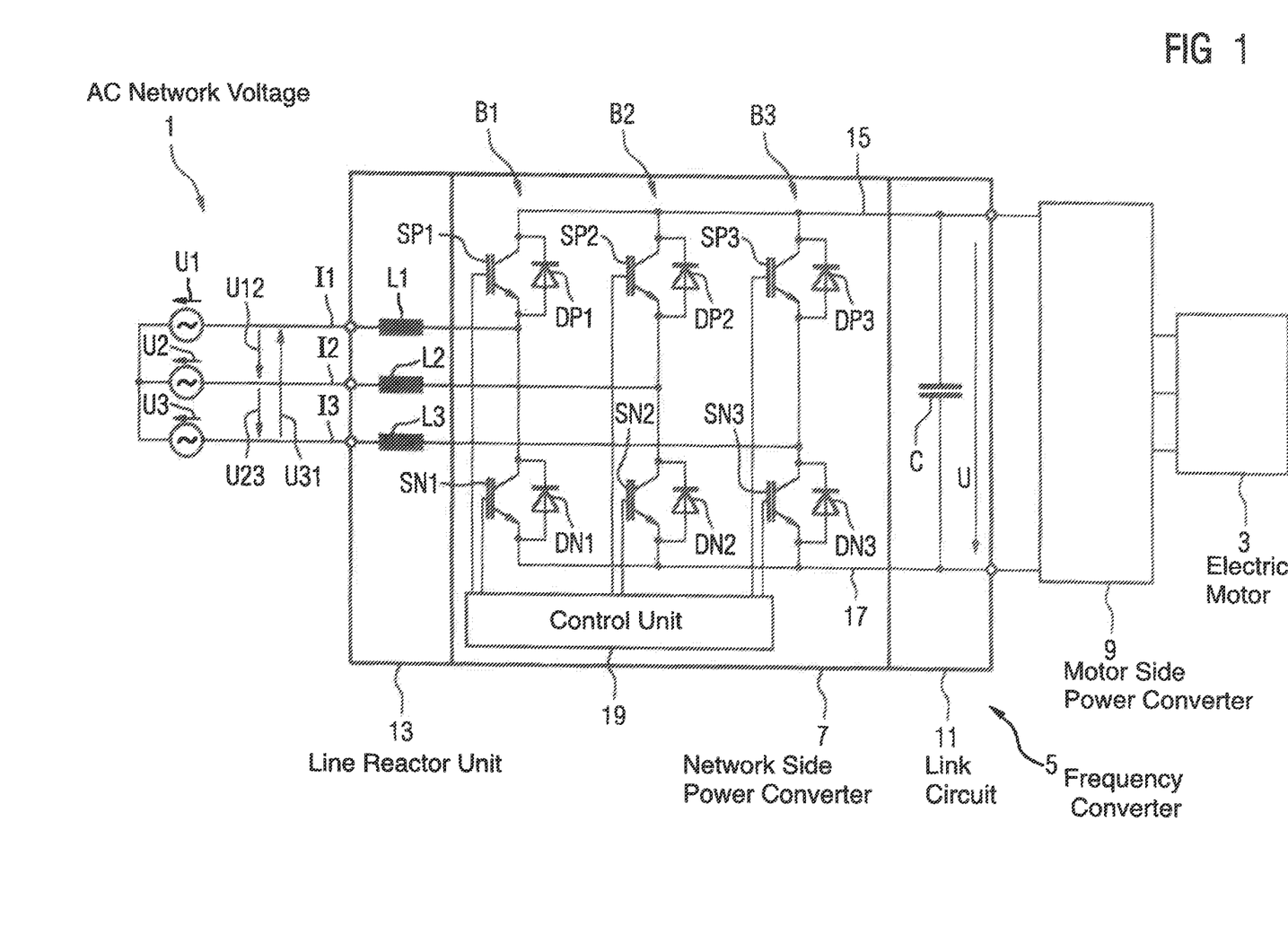
FIG. 1 shows a circuit diagram of a frequency converter operated between a three-phase AC voltage network and an electric motor with a first exemplary embodiment of a power converter.

FIG. 1 shows a circuit diagram of a frequency converter 5 operated between a three-phase AC voltage network 1 and an electric motor 3. The frequency converter 5 comprises a network-side power converter 7, a motor-side power converter 9, a link circuit 11 connected between the power converters 7, 9 and a line reactor unit 13 connected between the AC voltage network 1 and the power converter 7.

The link circuit 11 is a DC intermediate circuit with a DC voltage U (link circuit voltage) between a high potential rail 15 which is at a high potential, and a low potential rail 17 which is at a low potential. The link circuit 11 has a link circuit capacitor C.

The power converter 7 is a first exemplary embodiment of a power converter according to the invention. For each AC voltage phase of the AC voltage network 1, it comprises a half-bridge B1, B2, B3 which is connected to the AC voltage phase with a high potential-side semiconductor switch SP1, SP2, SP3 and a low potential-side semiconductor switch SN1, SN2, SN3. Each high potential-side semiconductor switch SP1, SP2, SP3 is connected antiparallel to a high potential-side diode DP1, DP2, DP3 and each low potential-side semiconductor switch SN1, SN2, SN3 is connected antiparallel to a low potential-side diode DN1, DN2, DN3. The semiconductor switches SP1, SP2, SP3, SN1, SN2, SN3 are each, for example, a bipolar transistor with an insulated gate electrode (Insulated-Gate Bipolar Transistor—IGBT). Alternatively, the semiconductor switches SP1, SP2, SP3, SN1, SN2, SN3 are each, for example, a metal oxide semiconductor field-effect transistor (MOSFET); in that case, the diode DP1, DP2, DP3, DN1, DN2, DN3 connected antiparallel to a semiconductor switch SP1, SP2, SP3, SN1, SN2, SN3 can also be an Intrinsic diode of the MOSFET, also referred to as an inverse diode or body diode.

The power converter 7 also has a control unit 19 which is designed to bigger the semiconductor switches SP1, SP2, SP3, SN1, SN2, SN3 in an operation of the power converter 7 as an inverter according to the Invention, as described in greater detail below on the basis of FIG. 2.

The power converter 9 is designed in a manner known from the prior art having a half-bridge with semiconductor switches for each AC voltage phase of the motor 3, but is not shown in detail here since its specific design is not relevant to the invention.

For each AC voltage phase of the AC voltage network 1, the line reactor unit 13 has an inductance L1, L2, L3.

An AC voltage of a first AC voltage phase of the AC voltage network 1 is identified as U1 and a network current of the first AC voltage phase is identified as I1. Accordingly, U2 denotes an AC voltage and I2 a network current of a second AC voltage phase and U3 an AC voltage and I3 a network current of the third AC voltage phase. U12=U1−U2, U23=U2−U3 and U31=U3−U1 denote interlinked voltages between the AC voltage phases.

Figure 2:
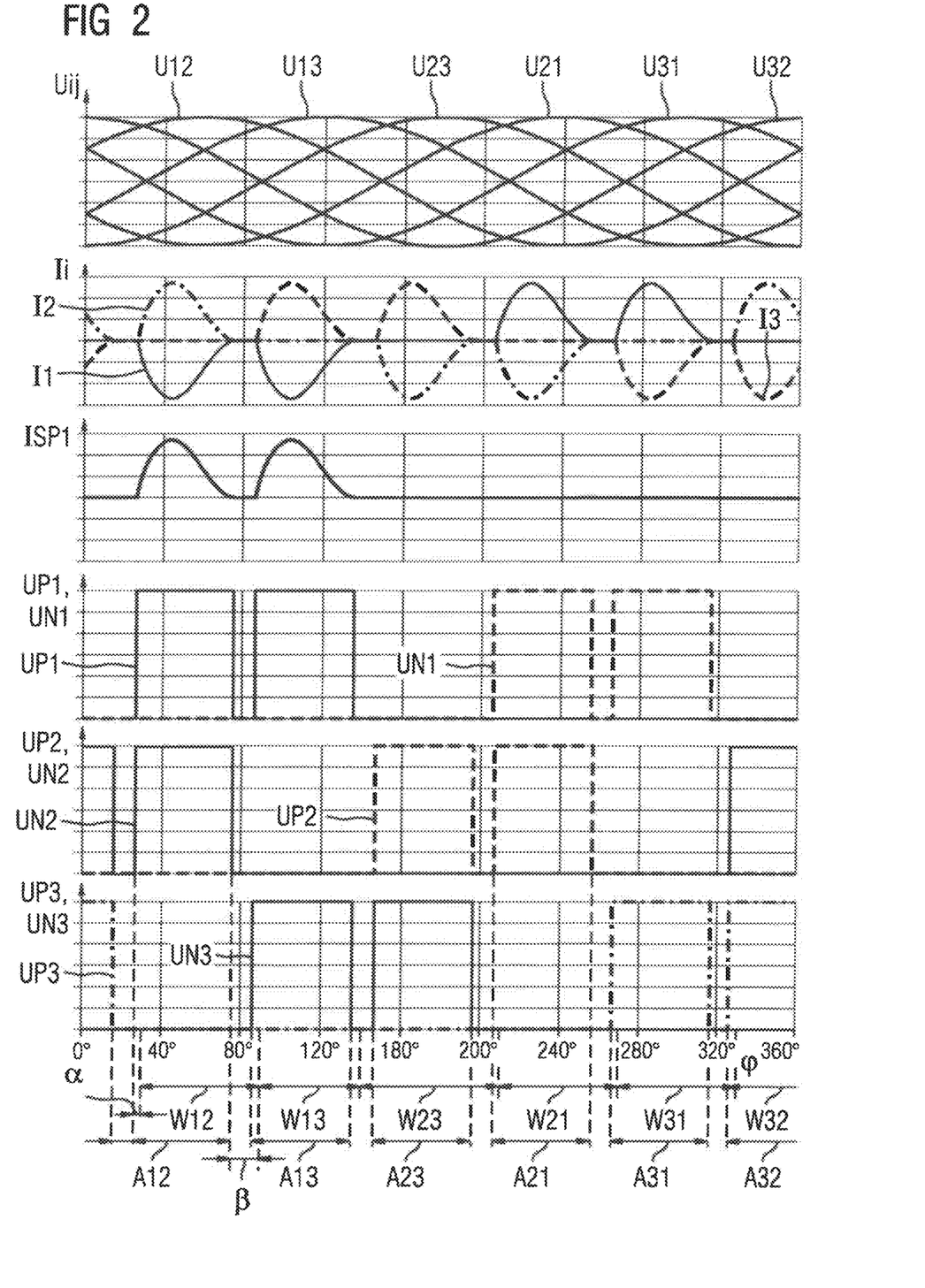
FIG. 2 shows interlinked voltages of the AC voltage network, network currents, a switch current and trigger signals during operation of the power converter shown in FIG. 1 as an inverter.

FIG. 2 illustrates the operation of the power converter 7 shown in FIG. 1 as an inverter in accordance with the Inventive method for feeding back electrical energy from the electric motor 3 in generator operation into the AC voltage network 1.

For this purpose, FIG. 2 shows trigger signals UP1, UP2, UP3, UN1, UN2, UN3 with which the semiconductor switches SP1, SP2, SP3, SN1, SN2, SN3 are each triggered by way of the control unit 19 via their gate terminals during an angular period of a phase angle φ of the AC voltage of the AC voltage network 1. For example, UP1 denotes a trigger signal with which the semiconductor switch SP1 is triggered and UN1 denotes a trigger signal with which the semiconductor switch SN1 is triggered. Accordingly, UP2 denotes a trigger signal for the semiconductor switch SP2, UN2 denotes a trigger signal for the semiconductor switch SN2, UP3 denotes a trigger signal for the semiconductor switch SP3 and UN3 denotes a trigger signals for the semiconductor switch SN3.

FIG. 2 also shows the interlinked voltages U12, U23, U31, U21=−U12, U32=−U23 and U13=−U31 of the AC voltage network 1 and, by way of example, a switch current ISP1 that flows through the semiconductor switch SP1 during the angular period of the AC voltage network 1. In the event that the semiconductor switch SP1 is an IGBT, ISP1 is, for example, a current between the collector terminal and the emitter terminal of the IGBT. In the event that the semiconductor switch SP1 is a MOSFET, ISP1 is a current between the drain terminal and the source terminal of the MOSFET. The trigger signals UP1, UP2, UP3, UN1, UN2, UN3, the interlinked voltages U12, U23, U31, U21, U32, U13 and the switch current ISP1 are each represented as dependent upon the phase angle φ during an angular period.

For each semiconductor switch SP1, SP2, SP3, SN1, SN2, SN3, within an angular period, two switch angular ranges W12, W23, W31, W21, W32, W13 are specified by way of a lower range limit and an upper range limit in each case. Each switch angular range W12, W23, W31, W21, W32, W13 of a high potential-side semiconductor switch SP1, SP2, SP3 is specified as a phase angle range in which the interlinked voltage U12, U23, U31, U21, U32, U13 between the AC voltage phase connected to the semiconductor switch SP1, SP2, SP3 and a further AC voltage phase is a greatest of all the interlinked voltages U12, U23, U31, U21, U32, U13. For the semiconductor switch SP1, a switch angular range W12=[30°, 90°] In which the interlinked voltage U12 is greatest and a switch angular range W13=[90°, 150°] in which the interlinked voltage U13 is greatest are specified. For example, for the semiconductor switch SP2, a switch angular range W23=[150°, 210°] in which the interlinked voltage U23 is greatest and a switch angular range W21=[210°, 270°] in which the interlinked voltage U21 is greatest are specified. For the semiconductor switch SP3, a switch angular range W31=[270°, 330°] in which the interlinked voltage U31 is greatest and a switch angular range W32=[330°, 360°]∪[0°, 30°] in which the interlinked voltage U32 is greatest are specified.

Each switch angular range W12, W23, W31, W21, W32, W13 of a low potential-side semiconductor switch SN1, SN2, SN3 is specified as a phase angle range in which the interlinked voltage U12, U23, U31, U21, U32, U13 between the AC voltage phase connected to the semiconductor switch SP1, SP2, SP3 and a further AC voltage phase is a smallest of all the interlinked voltages U12, U23, U31, U21, U32, U13. For example, for the semiconductor switch SN1, the switch angular range W21 In which the interlinked voltage U12 is smallest and the switch angular range W31 in which the interlinked voltage U13 Is smallest are specified. For the semiconductor switch SN2, the switch angular range W12 in which the interlinked voltage U21 is smallest and the switch angular range W32 in which the interlinked voltage U23 Is smallest are specified. For the semiconductor switch SN3, the switch angular range W13 in which the interlinked voltage U31 Is smallest and the switch angular range W23 in which the interlinked voltage U32 is smallest are specified.

Each switch angular range W12, W23, W31, W21, W32, W13 is thus specified, in particular, symmetrically about the extreme point of the phase angle φ at which the respective interlinked voltage U12, U23, U31, U21, U32, U13 has an extreme value, that Is, the extreme value forms the midpoint of the switch angular range W12, W23, W31, W21, W32, W13. For example, the interlinked voltage U12 assumes its maximum in an angular period at the extreme point 60°, which is at the midpoint of the switch angular range W12.

For each switch angular range W12, W23, W31, W21, W32, W13, a pre-ignition angle α and a pre-quenching angle β are determined in a manner described in greater detail below. Furthermore for each switch angular range W12, W23, W31, W21, W32, W13, an activation angular interval A12, A23, A31, A21, A32, A13 is determined, the lower interval limit of which is formed by subtraction of the pre-ignition angle α from the lower range limit of the switch angular range W12, W23, W31, W21, W32, W13 and the upper Interval limit of which is formed by subtraction of the pre-quenching angle β from the upper range limit of the switch angular range W12, W23, W31, W21, W32, W13. For example, the activation angular interval A12 for the switch angular range W12 that is, according to A12=[30%−α, 90°−β] with the pre-ignition angle α and the pre-quenching angle β, which have been determined for the switch angular range W12 is formed. Accordingly, the activation angular Intervals A23, A31, A21, A32, A13 are formed for the other switch angular ranges W23, W31, W21, W32, W13.

The semiconductor switches SP1, SP2, SP3, SN1, SN2, SN3 are then switched on in the activation angular intervals A12, A23, A31, A21, A32, A13 determined for them in that the trigger signal UP1, UP2, UP3, UN1, UN2, UN3 for the respective semiconductor switch SP1, SP2, SP3, SN1, SN2, SN3 is raised to an activation level during the two activation angular intervals A12, A23, A31, A21, A32, A13 determined for these semiconductor switches SP1, SP2, SP3, SN1, SN2, SN3. Thus, for example, the semiconductor switch SP1 is switched on in the activation angular intervals A12 and A13, whereby the switch current ISP1 through the semiconductor switch SP1 Initially rises in each of the two activation angular intervals A12, A13 and thereafter falls again.

In the example shown in FIG. 2, all the switch angular ranges W12, W23, W31, W21, W32, W13 have the same pre-ignition angle α and the same pre-quenching angle β. In general, however, the pre-ignition angle α and/or the pre-quenching angle β of different switch angular ranges W12, W23, W31, W21, W32, W13 can differ from one another, since load conditions during an angular period can change. Furthermore, the pre-Ignition angle α and the pre-quenching angle β are each positive in the example shown in FIG. 2. However, the pre-ignition angle α and/or the pre-quenching angle β of a switch angular range W12, W23, W31, W21, W32, W13 can in general also be negative (see FIG. 3). Furthermore, the two activation angular intervals A12, A23, A31, A21, A32, A13 of each semiconductor switch SP1, SP2, SP3, SN1, SN2, SN3 can be disjoint in the example given in FIG. 2. In general, however, the two activation angular intervals A12, A23, A31, A21, A32, A13 of a semiconductor switch SP1, SP2, SP3, SN1, SN2, SN3 can also overlap, so that the semiconductor switch SP1, SP2, SP3, SN1, SN2, SN3 is switched on in a phase angle range defined by the unifying of the two activation angular intervals A12, A23, A31, A21, A32, A13. In particular, the length of the individual activation angular intervals A12, A23, A31, A21, A32, A13 normally grows with an electrical power level that the power converter 7 emits into the AC voltage network 1, so that the two activation angular intervals A12, A23, A31, A21, A32, A13 of a semiconductor switch SP1, SP2, SP3, SN1, SN2, SN3 are disjoint at low power levels and, at higher power levels, they overlap.

The pre-ignition angle $\alpha$ and the pre-quenching angle $\beta$ of the switch angular range W12, W23, W31, W21, W32, W13 of a semiconductor switch SP1, SP2, SP3, SN1, SN2, SN3 are determined such that the activation angular interval A12, A23, A31, A21, A32, A13 corresponds to a diode lead angle interval at which the diode DP1, DP2, DP3, DN1, DN2, DN3 connected antiparallel to the semiconductor switch SP1, SP2, SP3, SN1, SN2, SN3 has current flowing through it in an operation of the power converter 7 as a rectifier with load conditions comparable to the operation of the power converter 7 as an inverter. Therein, the interval limits of the activation angular interval A12, A23, A31, A21, A32, A13 arise substantially from a mirroring of the interval limits of the corresponding diode lead angle interval at the midpoint of the switch angular range W12, W23, W31, W21, W32, W13. The invention will now be described in greater detail by reference to FIGS. 3 and 4.

Figure 3:
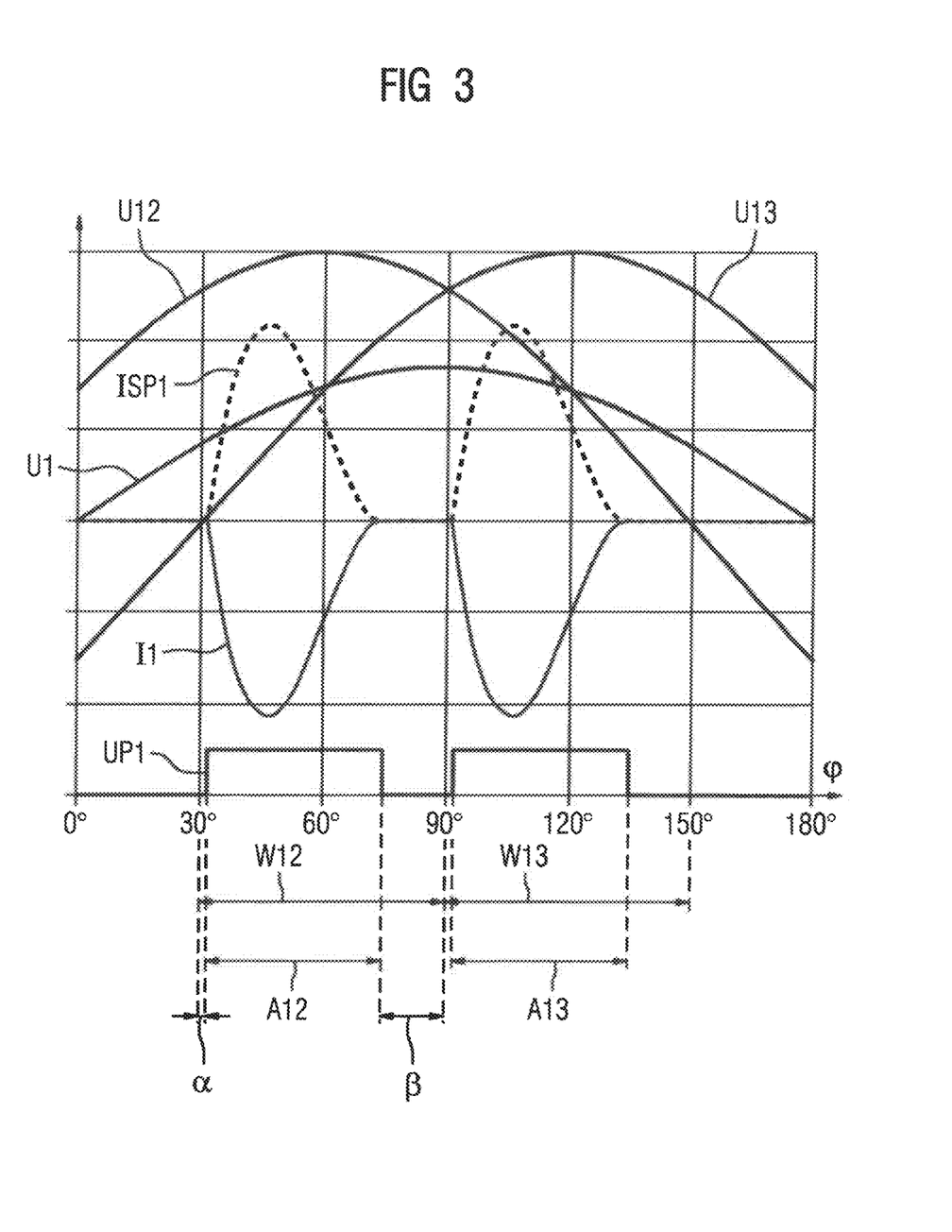
FIG. 3 shows an AC voltage and two interlinked voltages of the AC voltage network, a network current, a switch current and a trigger signal during operation of the power converter shown in FIG. 1 as a rectifier.

FIG. 3 shows, similarly to FIG. 2, the voltage U1 of the first AC voltage phase, the interlinked voltages U12, U13, the network current I1 and the switch current ISP1 that flows through the semiconductor switch SP1, dependent upon the phase angle $\varphi$ during a half angular period of the phase angle $\varphi$ in an operation of the power converter 7 shown in FIG. 1 as an inverter, wherein as distinct from FIG. 2, the pre-ignition angle $\alpha$ is negative.

Figure 4:
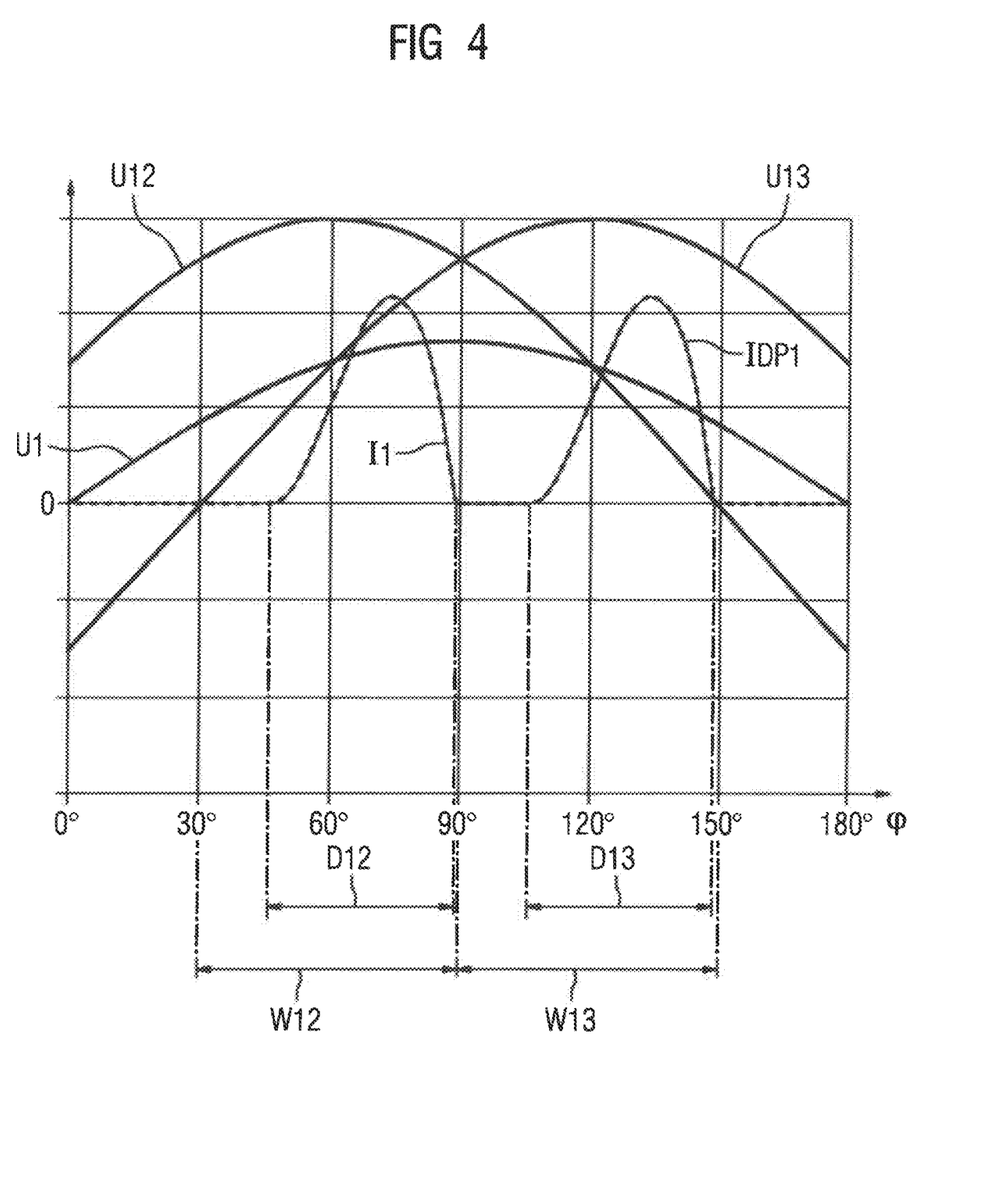
FIG. 4 shows an AC voltage and two interlinked voltages of the AC voltage network, a network current, and a diode current during operation of the power converter shown in FIG. 1 as a rectifier.

FIG. 4 shows, similarly to FIG. 3, the voltage U1 of the first AC voltage phase, the interlinked voltages U12, U13, the network current I1 and a diode current IDP1 that flows through the diode DP1, dependent upon the phase angle $\varphi$ during a half angular period of the phase angle $\varphi$ in an operation of the power converter 7 shown in FIG. 1 as a rectifier during operation of the frequency converter 5 for supplying the electric motor 3 with electrical energy from the AC voltage network 1 with load conditions comparable to the operation of the power converter 7 as an inverter according to FIG. 3. In this case, the diode current IDP1 matches the network current I1.

In this operation of the power converter 7, all the semiconductor switches SP1, SP2, SP3, SN1, SN2, SN3 are switched off and the diode DP1 conducts electric current during a diode lead angle interval D12 and a diode lead angle interval D13. According to the invention, the activation angular intervals A12 and A13 for the semiconductor switch SP1 (see FIG. 3) are substantially formed by a mirroring of the interval limits of the corresponding diode lead angle interval D12, D13 at the midpoint of the respective switch angular range W12, W13.

For example, the activation angular interval A12 is formed substantially by way of a mirroring of the diode lead angle interval D12 at the midpoint 60° of the switch angular range W12. The midpoint of the activation angular interval A12 is thereby displaced relative to the midpoint of the associated switch angular range W12 to the lower range limit 30° of the switch angular range W12, since the midpoint of the diode lead angle interval D12 is displaced relative to the midpoint of the switch angular range W12 to the upper range limit 90° of the switch angular range W12.

The pre-ignition angle $\alpha$ and the pre-quenching angle $\beta$ of a switch angular range W12, W23, W31, W21, W32, W13 for a semiconductor switch SP1, SP2, SP3, SN1, SN2, SN3 are each determined as the sum $\alpha=\alpha_0+\alpha_C$, $\beta=\beta_0+\beta_C$ of a feed forward value $\alpha_0$, $\beta_0$ and a correction value $\alpha_C$, $\beta_C$. The feed forward values $\alpha_0$, $\beta_0$ are determined dependent upon an electric power level to be fed into the AC voltage network 1 by the power converter 7. By way of the correction values $\alpha_C$, $\beta_C$, a current which flows in the bridge arm of that half-bridge B1, B2, B3 in which the semiconductor switch SP1, SP2, SP3, SN1, SN2, SN3 is arranged is readjusted. This current is regulated by way of the correction values $\alpha_C$, $\beta_C$ such that a current flow through the diode DP1, DP2, DP3, DN1, DN2, DN3 connected antiparallel to the semiconductor switch SP1, SP2, SP3, SN1, SN2, SN3 and thus a reactive power level and a current flow through the semiconductor switch SP1, SP2, SP3, SN1, SN2, SN3 at the end of the activation angular interval A12, A23, A31, A21, A32, A13 are reduced (and ideally eliminated completely).

The method described above for a three-phase AC voltage network 1 is adapted in an obvious manner for a multiphase AC voltage network 1 with a different number of AC voltage phases in that it is adapted to the respective number of interlinked voltages. For an n-phase AC voltage network 1 where n>1, for each semiconductor switch of a power converter 7 with n half-bridges, n−1 switch angular ranges are specified and n−1 activation angular Intervals are determined.

For a single-phase AC voltage network 1 also, the method can be used accordingly. Two examples with a single-phase AC voltage network 1 will now be described in greater detail by reference to FIGS. 5 to 8.

Figure 5:
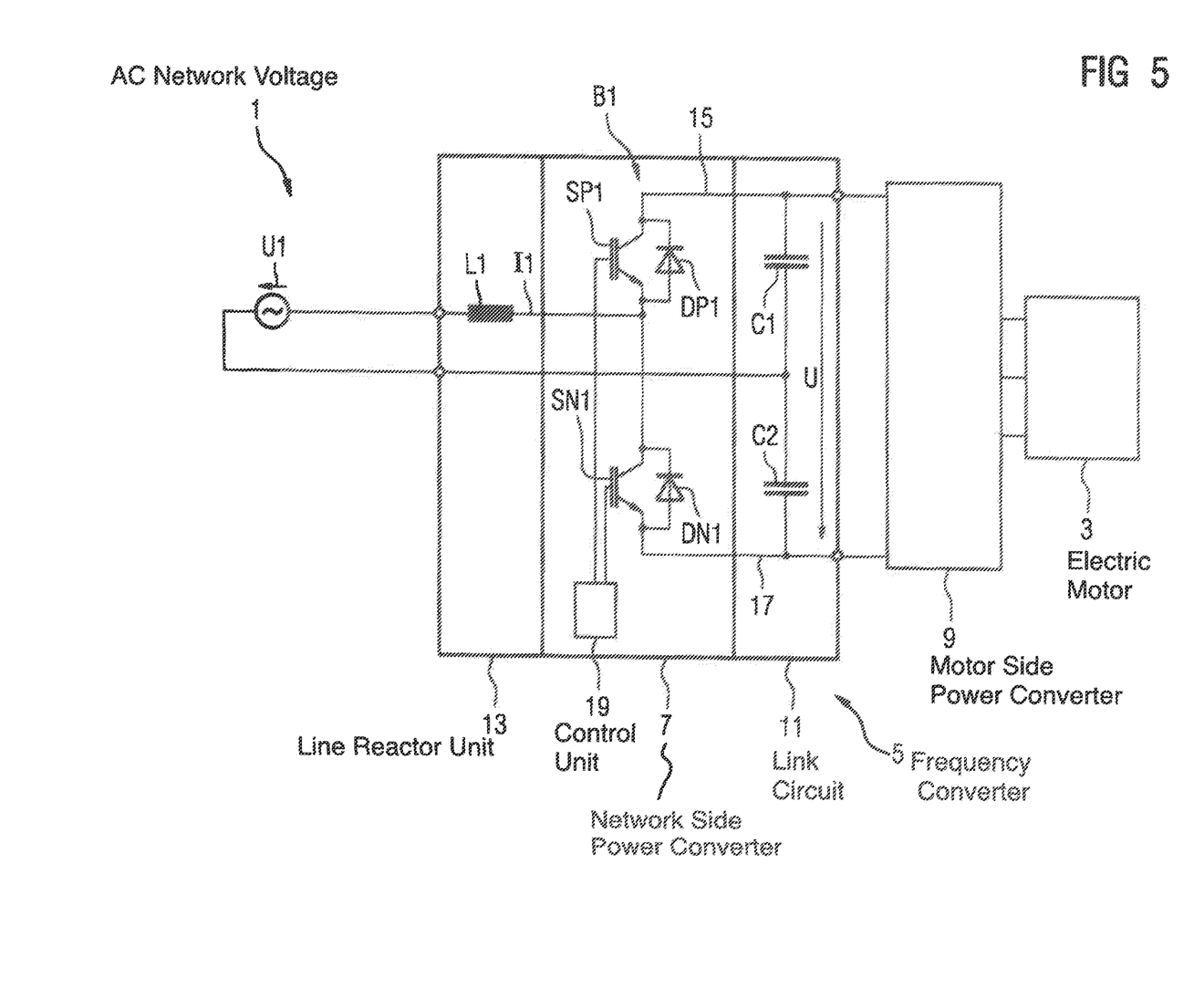
FIG. 5 shows a circuit diagram of a frequency converter operated between a single-phase AC voltage network and an electric motor with a second exemplary embodiment of a power converter.
Figure 6:
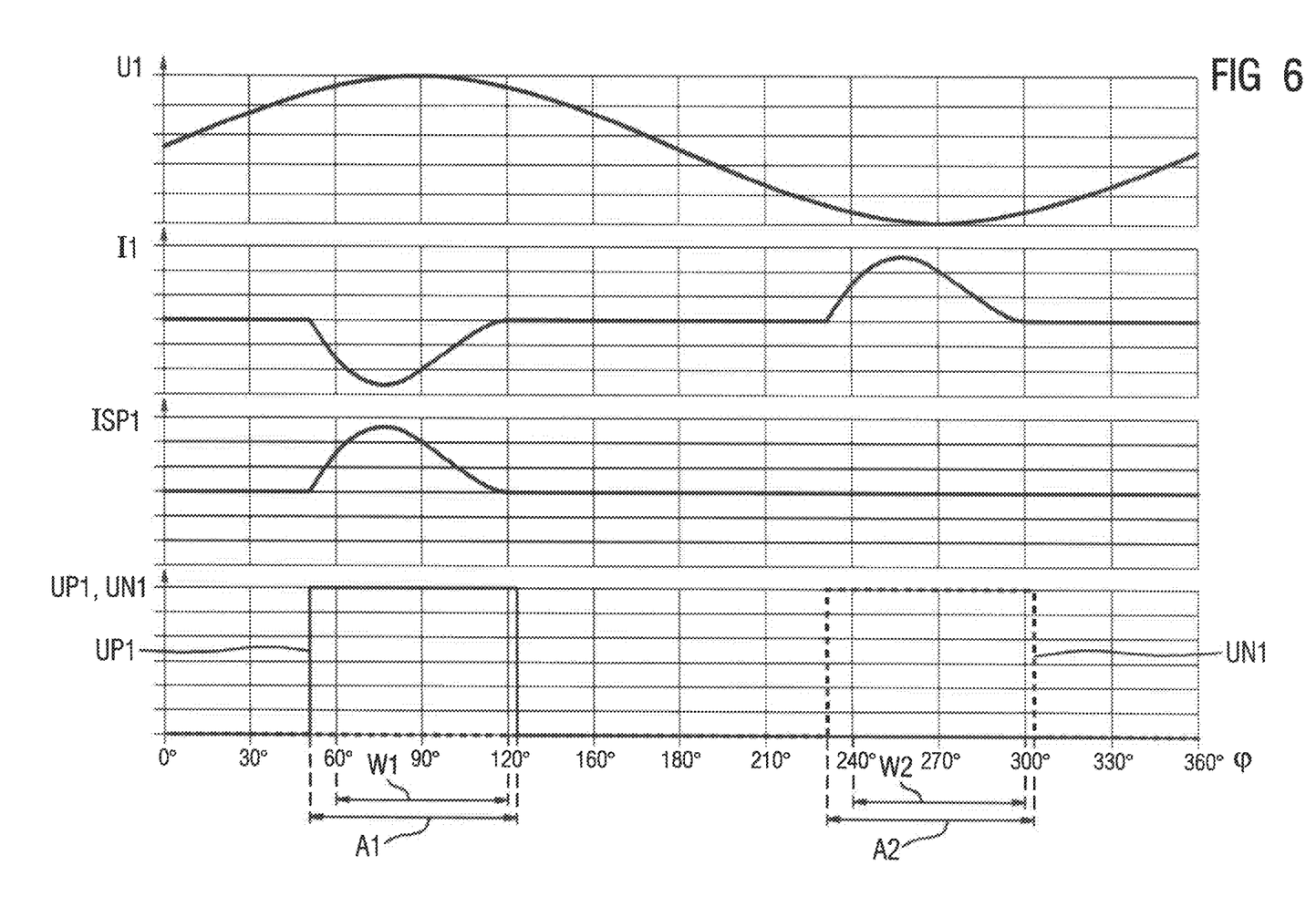
FIG. 6 shows an AC voltage of the AC voltage network, a network current, a switch current and trigger signals during operation of the power converter shown in FIG. 5 as an inverter.

FIG. 5 shows a first example of a frequency converter 5 operated between a single-phase AC voltage network 1 and an electric motor 3, wherein the frequency converter 5 is configured similarly to FIG. 1. The network-side power converter 7 of the frequency converter 5 has a half-bridge B1 which is connected via an inductance L1 of the line reactor unit 13 to the AC voltage U1 of the AC voltage network 1 and a high potential-side semiconductor switch SP1, a low potential-side semiconductor switch SN1 and a diode DP1, DN1 connected antiparallel thereto in each case. The link circuit 11 has two link circuit capacitors C1, C2 which are connected via an electrical conductor that is connected to the AC voltage U1, FIG. 6 illustrates the operation of the power converter 7 shown in FIG. 5 as an inverter in accordance with the inventive method for feeding back electrical energy generated by the electric motor 3 in generator operation into the AC voltage network 1 similarly to FIG. 2. For the high potential-side semiconductor switch SP1, a switch angular range W1=[60°, 120°] is specified, at the midpoint of which the AC voltage U1 assumes its maximum during an angular period of a phase angle $\varphi$. For the low potential-side semiconductor switch SN1, a switch angular range W2=[240°, 300°] is specified, at the midpoint of which the AC voltage U1 assumes its minimum during an angular period of the phase angle $\varphi$. Similarly to the method described by reference to FIG. 2, for the switch angular range W1, an activation angular interval A1 is determined during which the semiconductor switch SP1 Is switched on by the trigger signal UP1 and, for the switch angular range W2, an activation angular interval A2 is determined within which the semiconductor switch SN1 is switched on by the trigger signal UN1. By way of example, a switch current ISP1 through the semiconductor switch SP1 is also shown.

Figure 7:
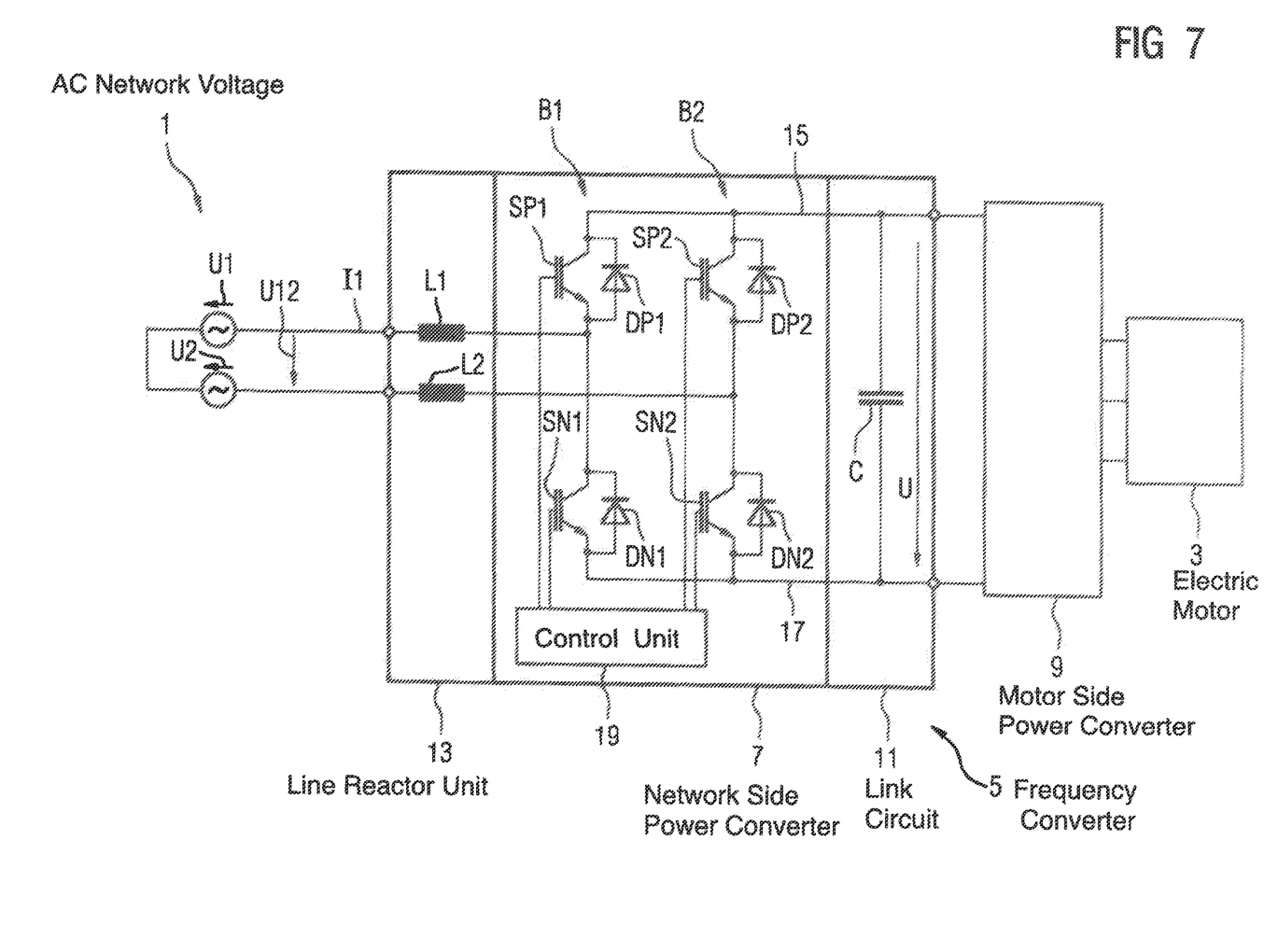
FIG. 7 shows a circuit diagram of a frequency converter operated between a single-phase AC voltage network and an electric motor with a third exemplary embodiment of a power converter.

FIG. 7 shows a second example of a frequency converter 5 operated between a single-phase AC voltage network 1 and an electric motor 3. In contrast to the example shown in FIG. 5, the network-side power converter 7 of the frequency converter 5 has two half-bridges B1, B2, wherein a first half-bridge B1 is connected via a first Inductance L1 of the line reactor unit 13 to the positive potential of the AC voltage U1 of the AC voltage network 1 and the second half-bridge B2 is connected via a second inductance L2 of the line reactor unit 13 to the negative potential of the AC voltage U2 of the AC voltage network 1. Each half-bridge has a high potential-side semiconductor switch SP1, SP2, a low potential-side semiconductor switch SN1, SN2 and a diode DP1, DP2, DN1, DN2 connected antiparallel thereto in each case.

Figure 8:
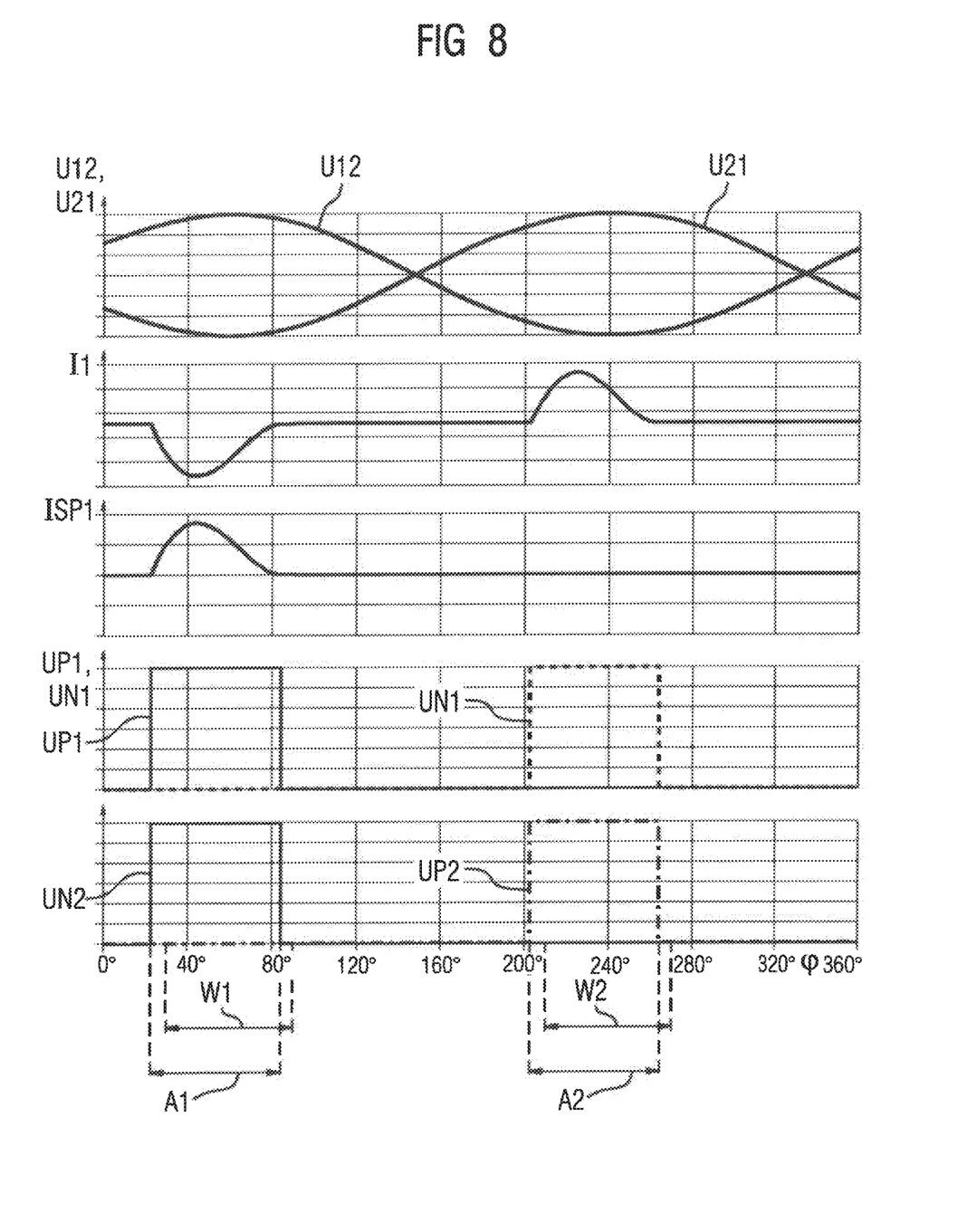
FIG. 8 shows AC voltages of the AC voltage network, a network current, a switch current and trigger signals during operation of the power converter shown in FIG. 7 as an inverter.

FIG. 8 illustrates the operation of the power converter 7 shown in FIG. 7 as an inverter in accordance with the Inventive method for feeding back electrical energy generated by the electric motor 3 in generator operation into the AC voltage network 1 similarly to FIGS. 2 and 6. A first switch angular range W1=[30°, 90°] at the midpoint of which the AC voltage U12 assumes its maximum during an angular period of a phase angle φ and a second switch angular range W2=[210°, 270°] at the midpoint of which the AC voltage U21 assumes Its maximum during an angular period of the phase angle φ are specified. Similarly to the method described by reference to FIG. 2, for the switch angular range W1, an activation angular interval A1 is determined during which the semiconductor switch SP1 is switched on by the trigger signal UP1 and the semiconductor switch SN2 is switched on by the trigger signal UN2 and for the switch angular range W2, an activation angular interval A2 is determined within which the semiconductor switch SP2 is switched on by the trigger signal UP2 and the semiconductor switch SN1 is switched on by the trigger signal UN1. By way of example, a switch current ISP1 through the semiconductor switch SP1 is also shown.

Although the invention has been illustrated and described in detail on the basis of preferred exemplary embodiments, the invention is not restricted by the examples disclosed and other variations can readily be derived therefrom by a person skilled in the art, without departing from the protective scope of the invention.

What is claimed is:

1. A method for operating a power converter as an inverter between a DC voltage with a high potential and a low potential, and an AC voltage network, and for each AC voltage phase of the AC voltage network, the power converter has at least one half-bridge connected to the AC voltage phase with a high potential-side semiconductor switch and a low potential-side semiconductor switch, each semiconductor switch connected antiparallel to a diode, said method comprising:
   specifying by way of a lower range limit and an upper range limit at least one switch angular range for each semiconductor switch within an angular period of a phase angle of the AC voltage;
   determining for each switch angular range a pre-ignition angle and a pre-quenching angle;
   determining an activation angular interval for each switch angular range, with a lower interval limit of the activation angular interval formed by subtraction of the pre-ignition angle from the lower range limit of the switch angular range and an upper interval limit of the activation angular Interval formed by subtraction of the pre-quenching angle from the upper range limit of the switch angular range; and
   switching on each semiconductor switch during each activation angular Interval determined for said semiconductor switch.

2. The method of claim 1, further comprising:
   determining the pre-ignition angle and the pre-quenching angle of the switch angular range of each semiconductor switch as a sum of a feed forward value and a correction value;
   determining the feed forward values dependent upon an electrical power level to be transferred by the power converter into the AC voltage network; and
   readjusting by way of the correction values, a current which flows in a bridge arm of that half-bridge in which the semiconductor switch is arranged.

3. The method of claim 1, further comprising determining the pre-ignition angle and the pre-quenching angle of the switch angular range of each semiconductor switch such that the activation angular interval corresponds to a diode lead angle interval at which the diode connected antiparallel to the semiconductor switch has current flowing through it in an operation of the power converter as a rectifier with load conditions comparable to the operation of the power converter as an inverter.

4. The method of claim 1, wherein a midpoint of an activation angular interval is displaced relative to a midpoint of the associated switch angular range to the lower range limit of the switch angular range.

5. The method of claim 1, wherein the AC voltage network is multiphase and for each semiconductor switch, specifying at least two switch angular ranges within an angular period of a phase angle of the AC voltage by way of a lower range limit and an upper range limit.

6. The method of claim 1, wherein the AC voltage network is single-phase and specifying for each high potential-side semiconductor switch a switch angular range within an angular period of a phase angle of the AC voltage connected to the semiconductor switch, so that the AC voltage has a maximum in the switch angular range.

7. A computer program embodied on a non-transitory computer readable medium comprising commands which, on execution of the computer program by a control unit, cause the control unit to carry out a method as set forth in claim 1.

8. The method of claim 3, wherein, the interval limits of the activation angular interval arise substantially by way of a mirroring of the interval limits of the corresponding diode lead angle interval at a midpoint of the switch angular range.

9. The method of claim 5, further comprising specifying the switch angular ranges dependent upon interlinked voltages of the AC voltage phases.

10. The method of claim 6, further comprising specifying for each low potential-side semiconductor switch a switch angular range within an angular period of a phase angle of the AC voltage connected to the semiconductor switch, so that the AC voltage has a minimum in the switch angular range.

11. The method of claim 9, further comprising specifying each switch angular range of each high potential-side semiconductor switch as a phase angle range in which the interlinked voltage between the AC voltage phase connected to the semiconductor switch and a further AC voltage phase is a greatest of all the interlinked voltages.

12. The method of claim 9, further comprising specifying each switch angular range of each low potential-side semiconductor switch as a phase angle range in which the interlinked voltage between the AC voltage phase connected to the semiconductor switch and a further AC voltage phase is a smallest of all the Interlinked voltages.

13. A power converter between a DC voltage with a high potential and a low potential and an AC voltage network, said power converter comprising:
- at least one half-bridge, for each AC voltage phase of the AC voltage network, connected to the AC voltage phase with a high potential-side semiconductor switch and a low potential-side semiconductor switch;
- a diode for each semiconductor switch connected anti-parallel to the semiconductor switch; and
- a control unit designed, during an operation of the power converter as an inverter to:
  - specify by way of a lower range limit and an upper range limit at least one switch angular range for each semiconductor switch within an angular period of a phase angle of the AC voltage,
  - determine for each switch angular range a pre-ignition angle and a pre-quenching angle,
  - determine an activation angular Interval for each switch angular range, a lower interval limit of the activation angular interval formed by subtraction of the pre-ignition angle from the lower range limit of the switch angular range and an upper interval limit of the activation angular interval formed by subtraction of the pre-quenching angle from the upper range limit of the switch angular range, and
  - switch on each semiconductor switch during each activation angular Interval determined for that switch.

14. A frequency converter, comprising a power converter between a DC voltage with a high potential and a low potential and an AC voltage network, said power converter comprising:
- at least one half-bridge, for each AC voltage phase of the AC voltage network, connected to the AC voltage phase with a high potential-side semiconductor switch and a low potential-side semiconductor switch;
- a diode for each semiconductor switch connected anti-parallel to the semiconductor switch; and
- a control unit which is designed, during an operation of the power converter as an inverter to:
- specify by way of a lower range limit and an upper range limit at least one switch angular range for each semiconductor switch within an angular period of a phase angle of the AC voltage;
- determine for each switch angular range a pre-ignition angle and a pre-quenching angle;
- determine an activation angular interval for each switch angular range, a lower interval limit of the activation angular interval formed by subtraction of the pre-ignition angle from the lower range limit of the switch angular range and an upper interval limit of the activation angular interval formed by subtraction of the pre-quenching angle from the upper range limit of the switch angular range;
- switch on each semiconductor switch during each activation angular Interval determined for that switch;
- and an electric motor supplied with energy by the power converter, wherein the power converter is operated for feeding back energy of the electric motor into the AC voltage network.

* * * * *